United States Patent
Bokenfohr et al.

(10) Patent No.: US 10,355,334 B2
(45) Date of Patent: *Jul. 16, 2019

(54) UNDERWATER CONNECTOR ARRANGEMENT

(71) Applicant: WiSub AS, Bergen (NO)

(72) Inventors: Mark Bokenfohr, Bergen (NO); Tomasz Ciamulski, Nesttun (NO)

(73) Assignee: WiSub AS, Bergen (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,327

(22) Filed: Oct. 4, 2016

(65) Prior Publication Data
US 2017/0054195 A1  Feb. 23, 2017

Related U.S. Application Data

(63) Continuation of application No. 14/000,324, filed as application No. PCT/EP2012/052873 on Feb. 20, 2012, now Pat. No. 9,490,521.

(30) Foreign Application Priority Data

Feb. 21, 2011 (NO) .................................. 20110292

(51) Int. Cl.
*H01Q 1/04* (2006.01)
*H04B 13/02* (2006.01)
*H01Q 1/22* (2006.01)

(52) U.S. Cl.
CPC ............ *H01Q 1/04* (2013.01); *H01Q 1/2291* (2013.01); *H04B 13/02* (2013.01)

(58) Field of Classification Search
CPC .... H04B 13/02; H04B 5/0031; H04B 5/0037; H04B 5/0075; H01Q 1/04; H01Q 1/2291
See application file for complete search history.

(56) References Cited

U.S. PATENT DOCUMENTS 3,299,398 A   1/1967 Hersey et al.
3,469,627 A * 9/1969 Baker .................... E21B 41/04
                                                166/356
(Continued)

FOREIGN PATENT DOCUMENTS

GB     2077514 A   12/1981
GB     2445015 A    6/2008
(Continued)

OTHER PUBLICATIONS

Tivey, Margaret, "Inductive Coupled Link," Woods Hole Oceanongraphic Institution, www.whoe.edu/home/pdf_files/tivey_ICL_description.3.pdf, Oct. 2004, 7 pages.
(Continued)

*Primary Examiner* — Tho G Phan
(74) *Attorney, Agent, or Firm* — Lewis Rice LLC (57) ABSTRACT

An underwater connector includes a first component and a second component, wherein the components are operable to be coupled together in operation in a first coupled state, and operable to be mutually spatially separated in a second uncoupled state. The first and second components each include communication arrangements which are operable to provide wireless communication between the first and second components when in their first coupled state. The first and second components include a power transfer arrangement for transmitting power between the first and second components. The power transfer arrangement includes inductive coupling devices and/or capacitive coupling devices, wherein the power transfer arrangement is implemented substantially as an annulus, for example circular, elliptical, or polygonal, on the first and second components together with the communication arrangements being disposed within the annulus and/or around a periphery of the annulus. The wireless communication is operable to occur using a wireless signal whose carrier frequency is within a (Continued)

frequency range of 300 MHz to 300 GHz, wherein the wireless communication is implemented using microwave and millimeter wave technologies.

17 Claims, 7 Drawing Sheets

(56) References Cited

U.S. PATENT DOCUMENTS

| | | | |
|---|---|---|---|
| 3,995,209 A | 11/1976 | Weston | |
| 4,915,118 A | 4/1990 | Kaufman et al. | |
| 5,592,156 A * | 1/1997 | James | H04B 13/02 340/850 |
| 5,740,214 A | 4/1998 | Rebec et al. | |
| 6,154,179 A * | 11/2000 | Kohno | H01Q 1/04 343/709 |
| 6,164,179 A * | 12/2000 | Buffman | F41F 3/07 114/316 |
| 6,525,762 B1 | 2/2003 | Mileski et al. | |
| 6,701,252 B2 | 3/2004 | Brown | |
| 6,763,195 B1 | 7/2004 | Willebrand et al. | |
| 6,738,314 B1 | 8/2004 | Teeter et al. | |
| 6,807,127 B2 | 10/2004 | McGeever, Jr. | |
| 7,110,678 B2 | 9/2006 | Willebrand et al. | |
| 7,123,842 B2 | 10/2006 | Hsiao et al. | |
| 7,301,474 B2 | 11/2007 | Zimmerman | |
| 7,711,322 B2 | 5/2010 | Rhodes et al. | |
| 7,800,475 B2 | 9/2010 | Mizutani et al. | |
| 7,873,316 B2 | 1/2011 | Rhodes et al. | |
| 8,179,279 B2 | 5/2012 | Voss | |
| 8,219,024 B2 | 7/2012 | Rhodes | |
| 8,237,585 B2 | 8/2012 | Zimmerman | |
| 8,295,764 B2 | 10/2012 | Rhodes et al. | |
| 8,305,227 B2 | 11/2012 | Jaffrey et al. | |
| 8,326,220 B2 | 12/2012 | Rhodes et al. | |
| 8,350,653 B2 | 1/2013 | Rhodes et al. | |
| 8,417,183 B2 | 4/2013 | Rhodes et al. | |
| 8,581,741 B2 | 11/2013 | Simpson et al. | |
| 8,716,902 B2 | 5/2014 | Rhodes et al. | |
| 9,490,521 B2 * | 11/2016 | Bokenfohr | H04B 13/02 |
| 9,705,186 B1 * | 7/2017 | Lozada-Ortiz | H01Q 1/34 |
| 2002/0122230 A1 | 9/2002 | Izadpanah et al. | |
| 2004/0037566 A1 | 2/2004 | Willebrand et al. | |
| 2006/0159158 A1 | 7/2006 | Moore et al. | |
| 2007/0264880 A1 | 11/2007 | Schiffer et al. | |
| 2008/0199124 A1 | 8/2008 | Nagatsuma et al. | |
| 2009/0102590 A1 | 4/2009 | Rhodes et al. | |
| 2009/0208219 A1 | 8/2009 | Rhodes et al. | |
| 2010/0156193 A1 | 6/2010 | Rhodes et al. | |
| 2012/0098674 A1 | 4/2012 | McStay et al. | |
| 2012/0175969 A1 | 7/2012 | Maughan et al. | |
| 2014/0098642 A1 * | 4/2014 | Rhodes | H01Q 1/04 367/134 |

FOREIGN PATENT DOCUMENTS

| | | |
|---|---|---|
| JP | 07029502 U | 1/1995 |
| JP | 2000348956 A | 12/2000 |
| WO | 01/95529 A1 | 12/2001 |
| WO | 2006134331 A1 | 12/2006 |
| WO | 2008117635 A1 | 10/2008 |
| WO | 2009135132 A1 | 11/2009 |
| WO | 2010099371 A1 | 9/2010 |

OTHER PUBLICATIONS

Somaraju, R. and Trumpf, J., "Frequency, Temperature and Salinity Variation of the Permittivity of Seawater," IEEE Transactions on Antennas and Propagation, vol. 54, No. 11, Nov. 2006, 8 pages.

Hirata, A. and Nagatsuma, T., "120 GHz millimetre-wave antenna for integrated photonic transmitter," Electrical Letters, vol. 37, No. 24, Nov. 22, 2001, 1 page.

Das, Santanu, et al., "New Approaches to Directional Antenna Technologies for Unmanned System Communications," Antennas and Propagation Society International Symposium (APSURSI), IEEE, Piscataway, New Jersey, USA, Jul. 11, 2010, 4 pages.

Abbosh, Amin M., et al., "Compact UHF Antenna in Aquatic Environments for Mobile Sporting Applications," Antennas and Propagation Society International Symposium (APSURSI), IEEE, Piscataway, New Jersey, USA, Jul. 11, 2010, 4 pages.

International Search Report, International Patent Application No. PCT/EP2012/052873, dated May 29, 2012, 12 pages.

European Search Report, Patent Application No. 12 707 058.9, dated Dec. 1, 2017 (4 pages).

* cited by examiner

UNDERWATER CONNECTOR ARRANGEMENT

CROSS REFERENCE TO RELATED APPLICATION(S)

This application is a Continuation of U.S. Utility patent application Ser. No. 14/000,324 filed Aug. 19, 2013 and currently pending, which is a § 371 U.S. National Phase of International Application Serial No.: PCT/EP2012/052873 filed Feb. 20, 2012 now expired, which, in turn, claims priority to Norwegian Application Serial No: 20110292 filed Feb. 21, 2011. The entire disclosure of all the above documents is herein incorporated by reference.

BACKGROUND

1. Field of the Invention

The present invention relates to underwater connector arrangements, for example underwater connector arrangements which are operable to provide wide-bandwidth signal transfer between two underwater objects without necessarily requiring a physical connection between them. Moreover, the present invention also concerns methods of transferring wide-bandwidth signals via underwater connector arrangements.

2. Description of Related Art

There is an increasing trend for deploying technical apparatus within ocean environments, for example associated with offshore exploration and production associated with oil and gas, as well as renewable energy systems which generate electrical power from ocean waves, ocean streams and ocean temperature differentials (Ocean Thermal Energy Conversion). Depletion of oil and gas reserves in the Middle East, onshore in the USA and in the North Atlantic Ocean has resulted in oil and gas companies considering boring and extracting for oil and gas in polar regions of the Earth which are largely devoid of land and covered in ice sheets. Moreover, most favourable conditions for ocean wave energy production lie in high latitudes approaching polar regions. Such aforementioned environments are harsh and technical apparatus failure can be costly to address. Moreover, ocean salt water is highly corrosive and conductive, which creates difficulties when undersea connections are being made. So whilst direct physical connections between conductors is a straightforward way of connecting cables, they face particular challenges when used underwater, particularly when it is necessary to separate and reconnect them underwater multiple times since this can adversely affect sealing integrity and so risk water ingress. Physical connections can also be hard to align accurately and are more restrictive in their ability to accommodate tight bending.

Inductive transfer of power at connectors has been described in a published United Kingdom patent application no. GB 2 456 039 A (Rhodes & Hyland, "Multimode wireless communication system", Wireless Fibre Systems Ltd.) wherein there is described a multimode system which operatively employs three mechanisms of light, radio and acoustic carriers in combination with a selection arrangement for selecting a most appropriate of the three carriers. The search report associated with this patent application identifies numerous earlier patent applications: GB 2297667A; EP1370014A2; EP0338765A2; WO 02/071657 A2; US Pub 2002/0067531; U.S. Pat. No. 5,081,543.

Longer range underwater communication using radio frequency (RF) signals has also been proposed—e.g. as set out in US 2009/0212969 which describes a system for communicating between a well-head assembly and an umbilical termination using RF signals.

Despite the proposals made to date, they have not achieved widespread commercial acceptance and the Applicant has recognised that there are some significant shortcomings associated with previous proposals. It is an aim of the present invention at least partially to address such shortcomings and to provide a commercially attractive underwater connector system.

SUMMARY

When viewed from a first aspect the invention provides an underwater connector arrangement for transmitting data from a first component to a second component, the first component comprising a transmitting non-coil antenna and the second component comprising a corresponding receiver, wherein the antenna is adapted to transmit data to the receiver by means of an electromagnetic carrier wave having a frequency of between 300 MHz and 300 GHz, wherein the non-coil antenna is received in a submersible encapsulation having a maximum external dimension equal to or greater than one eighth of the wavelength of said carrier wave.

According to another aspect of the invention, there is provided an underwater connector arrangement including a first component and a second component, wherein the components are operable to be coupled together in operation in a first coupled state, and operable to be mutually spatially separated in a second uncoupled state, characterized in that the first and second components each include communication arrangements which are operable to provide wireless communication between the first and second components when in their first coupled state, wherein the wireless communication is operable to occur using a wireless signal whose carrier frequency is within a frequency range of 300 MHz to 300 GHz, the wireless communication utilizing microwave and/or millimeter wave technology.

Microwave and/or millimeter wave technology would be understood by those skilled in the art as implying that the dimensions of the first component are similar to or larger than the wavelength of the waves being employed i.e. the dimensions are larger than half the wavelength. In fact it would be understood that the dimensions are larger than an eighth of the wavelength.

Thus when viewed from another aspect the invention provides an underwater connector arrangement including a first component and a second component, wherein the components are operable to be coupled together in operation in a first coupled state, and operable to be mutually spatially separated in a second uncoupled state, characterized in that the first and second components each include communication arrangements which are operable to provide wireless communication between the first and second components when in their first coupled state, wherein said wireless communication is operable to occur using a wireless signal whose carrier frequency is within a frequency range of 300 MHz to 300 GHz, said wireless communication utilizing microwave and/or millimeter wave technology such that the dimensions of the first component are greater than one eighth, preferably more than half, of the wavelength of said carrier.

Thus it will be seen by those skilled in the art that a connector arrangement is provided in which the components cooperate to provide an underwater data connection using microwaves or millimeter waves (i.e. those having frequency between 300 MHz and 300 GHz—hereinafter collectively referred to as "microwaves"), without requiring physical contact between conductors. Instead microwaves are generated by the antenna and travel to the receiver, which could be through water as well as through the component encapsulations. This allows fully sealed components that do not themselves need to be in physical contact (although for convenience they may be) and thus which can be manufactured with a long operating life even in very harsh marine environments. This addresses the problems set out above with connections involving physical contact between conductors.

The Applicant has realized in spite of a presumption in the art that microwaves cannot be used underwater, particularly subsea, due to their strong absorption by water, that in fact a highly effective high-bandwidth, short-range data communication between connector components can successfully be achieved, even through sea water, by using waves in a range of substantially 300 MHz to 300 GHz, optionally 1 GHz to 6 GHz. This contrasts with previous proposals to use inductive coupling to transfer data which is inherently limited to lower frequencies and so to lower bandwidths. It also contrasts with the longer range undersea communication using RF signals e.g. as disclosed in US 2009/0212969. As will be recognized by those skilled in the art, microwave transmission is fundamentally different from RF transmission in several respects. In RF transmission the wavelength is significantly greater than the dimensions of the transmitting and receiving elements and so it is governed by lumped element circuit theory. Here the shape, dimensions and physical setting of the transmitting and receiving elements are not especially critical. By contrast however in microwave transmission the transmitting and receiving elements are of roughly similar dimensions to the wavelength. The transmission is governed by distributed element circuit/transmission line theory and the shape, dimensions and physical setting of the transmitting and receiving elements are critical.

The encapsulation containing the antenna could be a housing mounted to another structure—e.g. a suitable bulkhead. The encapsulation could be provided at the end of a data-carrying cable. In a set of embodiments therefore a submersible cable for carrying data extends from the encapsulation. The encapsulation could comprise a discrete housing sealingly attached to the cable or could be integrally formed with the cable—e.g. by being moulded onto it.

The skilled person will appreciate that when considering the dimensions of the encapsulation, the dimensions of any cable, bulkhead or other structure to which it is mounted are excluded.

Although, as the Applicant has recognized, the dimensions of the encapsulation are of relevance when considering microwave frequencies, in preferred embodiments the antenna is also of similar dimensions. Thus in a preferred set of embodiments the antenna has an active portion which has a maximum dimension larger than one-eighth of the wavelength of said carrier wave.

Although in accordance with the invention in its broadest aspects no particular minimum separation between the components is implied, in a set of embodiments the antenna is adapted to transmit data to the receiver by means of radiation/propagation of the carrier wave if the receiver is separated from the antenna by a distance which is more than one-eighth of the wavelength of said carrier wave.

Although in accordance with the invention in its broadest terms data communication may take place between the antenna and receiver only one way, preferably the components are configured to permit two-way communication. Communication from the second component to the first could employ a different modality but preferably the receiver in the second component has the same characteristics as the antenna in the first component—i.e. it comprises a second non-coil antenna adapted to transmit data to the antenna of the first component by means of an electromagnetic carrier wave having a frequency of between 300 MHz and 300 GHz, wherein the non-coil antenna is received in a submersible encapsulation having a maximum external dimension equal to or greater than one eighth of the wavelength of said carrier wave.

Thus in a preferred set of embodiments the first and second components each comprise a non-coil antenna as set out above which are respectively able to transmit and receive data at different times. The first and second antennas are preferably identical.

The Applicant also envisages that a plurality of antennae may be provided in either or both components. There may be equal numbers in each, thereby enabling multiple independent channels. In one set of embodiments the first component comprises a plurality of said non-coil antennae arranged to transmit at a different frequency and/or using a different transmission protocol from each other.

Alternatively there may be different numbers so as to allow many-to-one communication—e.g. with a suitable multiplexing scheme. In one set of embodiments the first component comprises a single antenna arranged to transmit data to a plurality of independent transmitters. The first component may exchange data with a plurality of second components; in other words the first component could be designed such that it can act as a physical hub for a plurality of second components.

In a set of embodiments the underwater connector arrangement is configured to allow data transmission with the first and second components at a plurality of mutual rotational positions.

The microwave data communication disclosed herein has been found to be most effective over relatively short distances and thus in a set of embodiments the first and second components are less than a meter apart, preferably less than half a meter apart.

The Applicant has further appreciated that operating in the microwave/millimeter wave range allows any of a number of existing protocols for wireless data transmission in air to be used. Thus in a set of embodiments the first component is arranged to transmit data using a predefined protocol for wireless data transmission in air. For example the protocol may be selected from the group comprising: WiFi, GSM, Bluetooth, GPRS, CDMA and Zigbee. This is advantageous in that it allows existing software to be used but there is also a further advantage which may be realised when the components are removed from the water—e.g. for maintenance or inspection, since the same protocols can be used communicate with standard equipment on the ship (over much longer distances since the propagation is through air). This simplifies inspection and diagnostic operations. The first component could be arranged to transmit in exactly the same way as it does underwater when it is temporarily in air (e.g. for maintenance or inspection). In a set of embodiments however the first component is arranged to adapt its transmission when it is temporarily in air. In other embodiments a different antenna is provided for in-air transmissions.

In an advantageous set of embodiments the non-coil antenna is arranged to transmit directionally. This exploits a characteristic of an antenna suited to microwave transmission and gives a higher signal strength at the receiver for a given transmission energy level.

This is considered to be novel and inventive in its own right and thus when viewed from a further aspect the invention provides an underwater connector arrangement for transmitting data from a first component to a second component, the first component comprising a directional transmitting antenna and the second component comprising a corresponding receiver, wherein the antenna is arranged to transmit data to the receiver by means of an electromagnetic carrier wave having a frequency of between 300 MHz and 300 GHz.

The antenna may, for example, comprise a waveguide such as a horn.

The features of the connector arrangement in accordance with the first aspect of the invention are preferred features of this aspect. Thus preferably the antenna is received in an encapsulation having a maximum external dimension equal to or larger than one-eighth of the wavelength of said carrier wave.

In embodiments of all foregoing aspects of the invention the antenna has an active portion which has a maximum dimension larger than half the wavelength of said carrier wave.

In embodiments of all foregoing aspects of the invention the encapsulation comprises a non-metallic emission surface arranged to that in use said carrier wave passes through said surface. The rest of the encapsulation could be of the same material as the emission surface, a different non-metallic material, metal, or any combination of these.

Optionally, the underwater connector arrangement is implemented so that the first and second components include a power transfer arrangement for transmitting electrical power between the first and second components. More optionally, the power transfer arrangement comprises respective parts in the first and second components which cooperate to transfer power through inductive coupling and/or capacitive coupling. The Applicant has appreciated that with the relatively small physical size of components which the invention advantageously allows, care is necessary in the relative placements of the antenna and the inductive, capacitive or other power transfer parts in order to avoid interference of the data signals. The directional transmission possible with the directional transmitter of some embodiments can assist here. However the ability to substantially reduce or avoid such interference is a significant advantage over previous proposals.

In one set of embodiments the power transfer arrangement is disposed to allow power to be transferred with the first and second components at a plurality of mutual rotational positions.

The power transfer arrangement could be implemented substantially as an annulus on the first and second components together with the communication arrangements being disposed within the annulus and/or around a periphery of the annulus. Yet more optionally, the annulus is implemented as a circular form, elliptical form or polygonal form. More optionally, the first and second components are operable to be joinable at a range of mutually different angles, rendered possible by use of the annulus.

Optionally, the underwater connector arrangement is implemented such that the antenna and optionally other connected parts are embedded in an encapsulation material to prevent water coming into direct contact with electronic and/or electrical parts.

Optionally, a wireless antenna is provided for receiving and/or transmitting wireless radiation between the components, wherein the wireless antenna is provided with a dynamically-controlled impedance matching network arrangement for compensating for changes in antenna electrical impedance characteristics when, in operation, pressure applied via water to the connector changes.

In a set of embodiments the first and second components are provided with a latching arrangement for binding the first and second components together. Optionally the latching arrangement is implemented as a magnetic latching arrangement. The magnet could be permanent or energizable.

Optionally, the underwater connector arrangement further includes an optical data communication arrangement and/or an acoustic communication arrangement for communicating data between the first and second components.

Optionally, the underwater connector arrangement is implemented so that the first and second components have associated therewith data and/or power conditioning apparatus for conditioning data signals and/or power transfer signals for interfacing to the first and second components.

Optionally, the underwater connector arrangement is implemented such that the connector arrangement is adapted for use with ocean submarine vehicles, for example remotely operated vehicles (ROV). For example the first or second component could be provided on a remotely operated arm of an ROV.

Optionally, the underwater connector arrangement is adapted for use with distributed ocean wave energy production systems.

Optionally, the underwater connector arrangement is adapted for down-borehole operation.

Optionally, the underwater connector arrangement is implemented such that the wireless arrangement is adapted to provide wireless data transfer between the first and second components at data rates in excess of 1 Gbit/second.

In accordance with all aspects of the invention the underwater connector arrangement is preferably adapted to transmit data from the antenna to the receiver via saltwater, e.g. seawater.

The invention extends to a wireless data transfer component per se suitable for use as the first component of an underwater connector arrangement having any of the features described above. Indeed when viewed from another aspect the invention provides a component for underwater wireless data transfer, said component comprising a transmitting non-coil antenna adapted to transmit data to a corresponding receiver by means of an electromagnetic carrier wave having a frequency of between 300 MHz and 300 GHz, wherein the non-coil antenna is received in a submersible encapsulation having a maximum external dimension equal to or greater than one eighth of the wavelength of said carrier wave.

The invention also extends to a method of transferring data between a first underwater component and a second underwater component comprising transmitting an electromagnetic carrier wave having a frequency of between 300 MHz and 300 GHz from a non-coil antenna in the first component to a corresponding receiver in the second component, wherein the non-coil antenna is received in a submersible encapsulation having a maximum external dimension equal to or greater than one eighth of the wavelength of said carrier wave.

Also preferably the above-mentioned method comprises transmitting the carrier wave over a distance less than one meter, preferably less than 50 centimeters.

Also preferably the above-mentioned method comprises transmitting said carrier wave through salt water.

According to another aspect of the invention, there is provided a method of communicating data using an underwater connector arrangement including a first component and a second component, wherein the components are operable to be coupled together in operation in a first coupled state, and operable to be mutually spatially separated in a second uncoupled state, characterized in that the method includes:

(a) arranging for the first and second components each to include communication arrangements which are operable to provide wireless communication between the first and second components when in their first coupled state; and (b) providing the wireless communication using a wireless signal whose carrier frequency is within a frequency range of 300 MHz to 300 GHz, the wireless communication utilizing microwave and/or millimeter wave technology.

Preferably in the above-mentioned methods the carrier frequency is in the range of 1 GHz to 20 GHz, preferably 1 GHz to 6 GHz.

Optionally, the methods further involve including a power transfer arrangement in the first and second components and dynamically tuning operating of the power transfer arrangement for transmitting power between the first and second components.

It will be appreciated that features of the invention are susceptible to being combined in any combination without departing from the scope of the invention as defined by the appended claims.

Where reference is made herein to wavelengths, these should be understood as the wavelength measured in free space. Where the wavelength of the carrier waves varies, the minimum wavelength should be used for any comparison.

BRIEF DESCRIPTION OF THE DRAWINGS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF THE PREFERRED EMBODIMENTS

Figure 1:
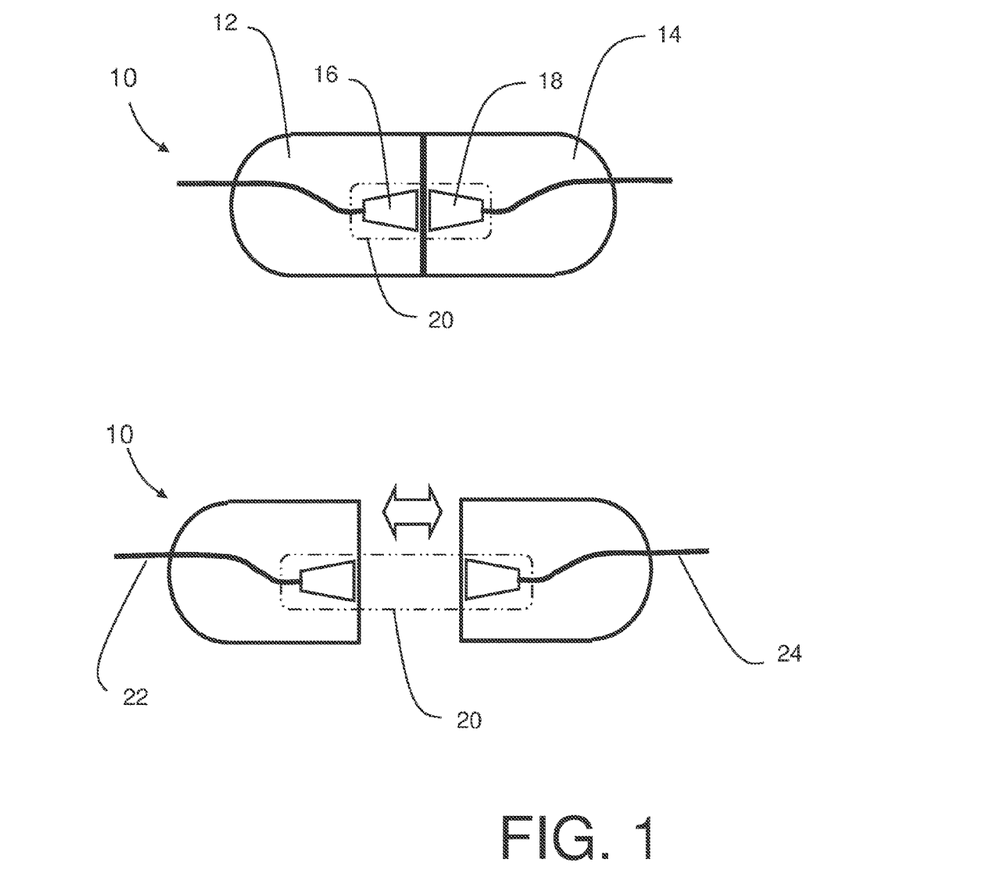
FIG. 1 is a schematic view of an underwater connector arrangement in accordance with an embodiment of the invention.

Referring to FIG. 1, an underwater connector arrangement 10 is shown which is suitable for being used in sub-sea environments. This comprises two components 12, 14, each of which comprises a respective non-coil antenna 16, 18 which is designed to be able to transmit and receive radiating or propagating microwaves or millimeter waves which might, depending on the application, be somewhere in the range of 300 MHz to 300 GHz. The antennae 16, 18 together form a wireless data connection 20 which allows data to be passed between the components 12, 14 and thereby connect respective attached cables 22, 24. The antennae 16, 18 are received in submersible encapsulations, the maximum dimensions of which are at least one eighth of the wavelength (or the minimum wavelength if the wavelength varies) of the carrier waves.

As shown in the lower part of FIG. 1, the wireless data connection may be maintained even when the two components 12, 14 are not in physical contact with one another since the microwaves are transmitted from one component, through the seawater to the other component.

Figure 2A:
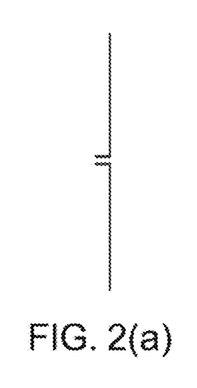
FIGS. 2(a), 2(b), 2(c), 2(d), and 2(e) are schematic illustrations of various possible antenna arrangements.
Figure 2B:
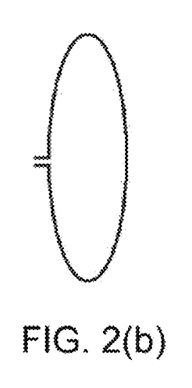
Figure 2C:
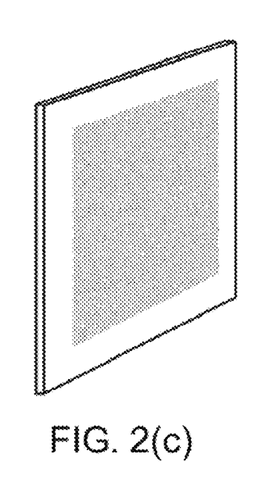

FIGS. 2(a) to 2(e) show various possible configurations for the non-coil antenna 16, 18 depicted schematically in FIG. 1. One of the most basic forms of possible antenna shapes is a dipole and this is shown in FIG. 2(a). Another basic form is the loop antenna shown in FIG. 2(b). A further possible form is a patch antenna as shown in FIG. 2(c) and comprises a planar panel from which the waves are generated.

Figure 2D:
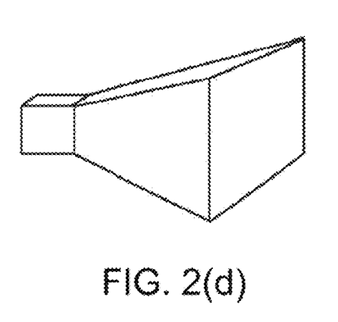
Figure 2E:
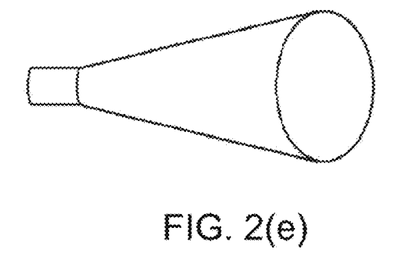

The antennae shown in FIGS. 2(a) to 2(c) will generate travelling electromagnetic waves in the microwave and millimeter range having characteristic angular distributions which are well known in the art. The patch antenna shown in FIG. 2c is asymmetric in that it radiates most energy in the forward direction. In some embodiments however the directionality of the antennae is enhanced by adding a waveguide in the form of a horn as is shown in FIGS. 2(d) and 2(e).

The antennae have an active portion which has a maximum dimension which is at least one-eighth of the wavelength of the waves being transmitted/received more typically more than half a wavelength. However given the high frequencies that are used in accordance with the invention, this still allows the connector component to be very compact.

Using propagating microwaves in accordance with the invention it can be shown that reliable, high data rate communication can be achieved even through sea water. For example a rate of up to 1 GBs can be achieved through up to ten centimeters of sea water and effective communication can be carried out over longer distances—e.g. up to one meter. This greatly simplifies their use in challenging marine environments over physical contact connectors.

Figure 3:
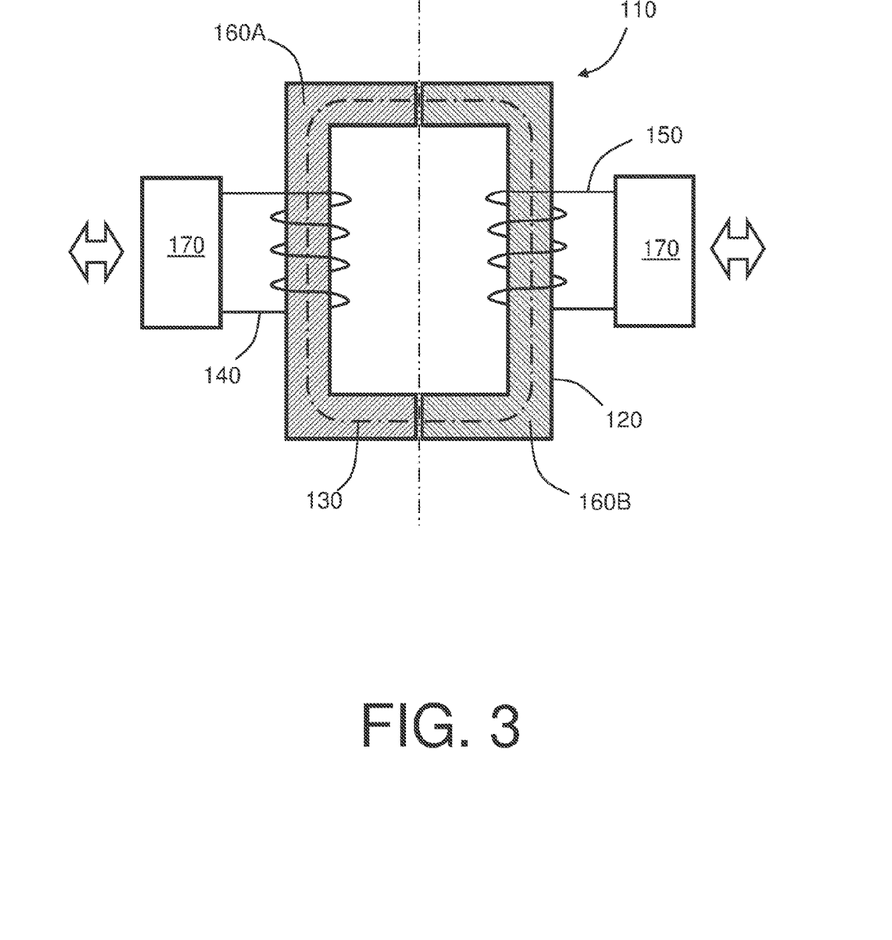
FIG. 3 is an illustration of a transformer arrangement for magnetically transferring power.
Figure 4:
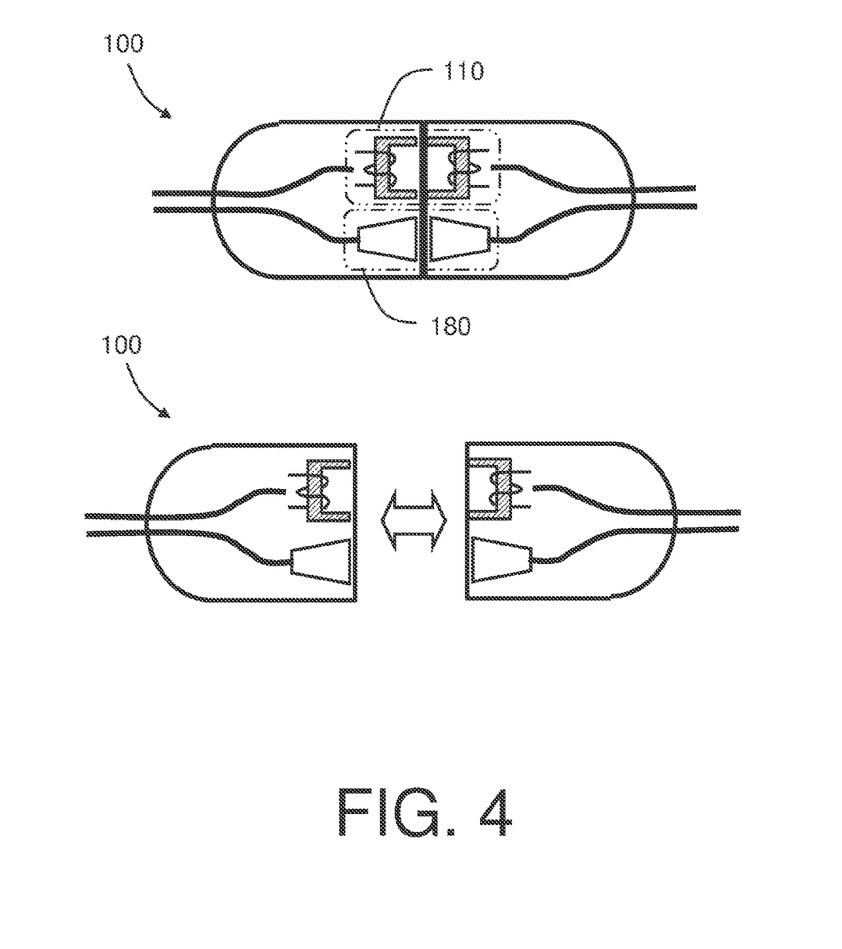
FIG. 4 is an illustration of an underwater connector arrangement with magnetically coupled power transfer and wireless coupled signal exchange.
Figure 5:
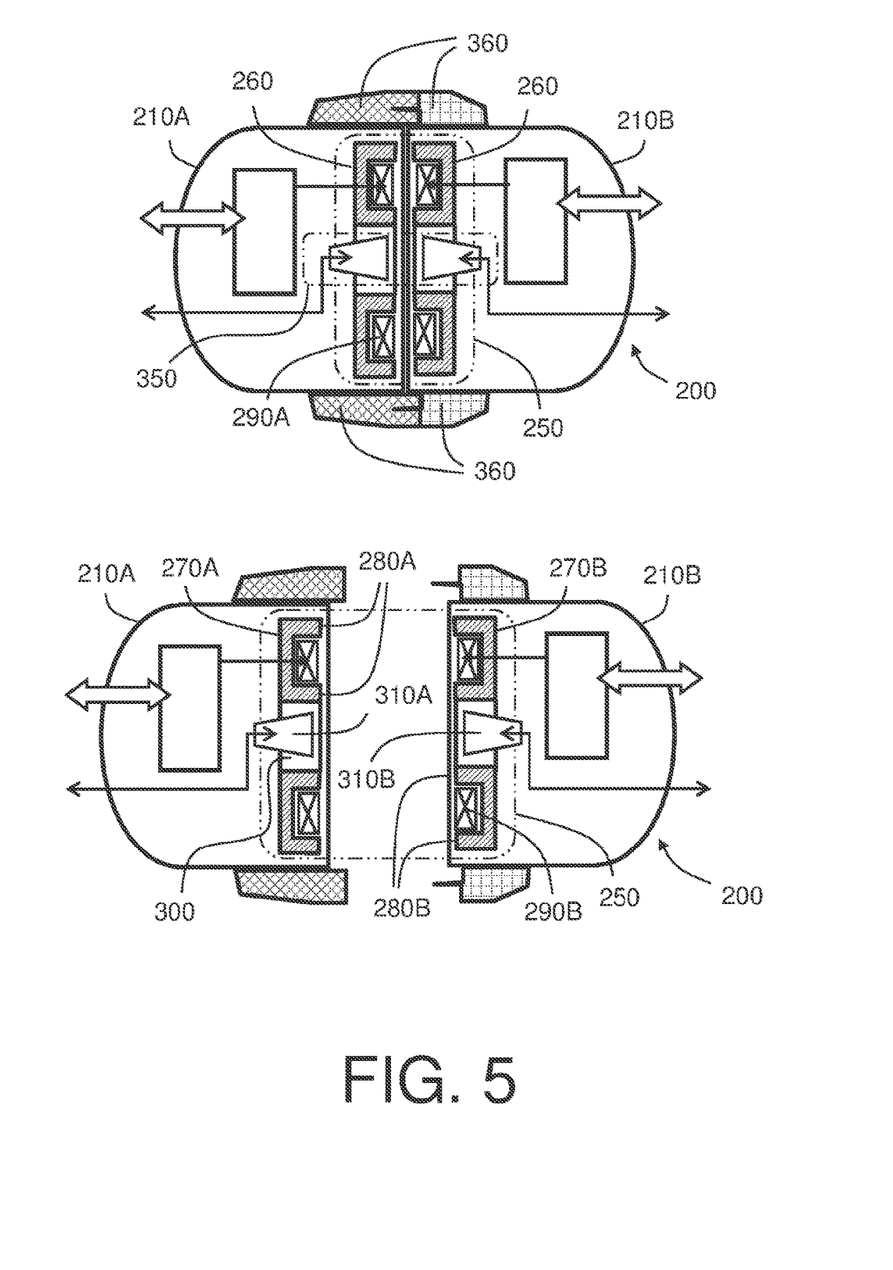
FIG. 5 is an illustration of an embodiment of an underwater connector arrangement pursuant to the present invention.
Figure 6:
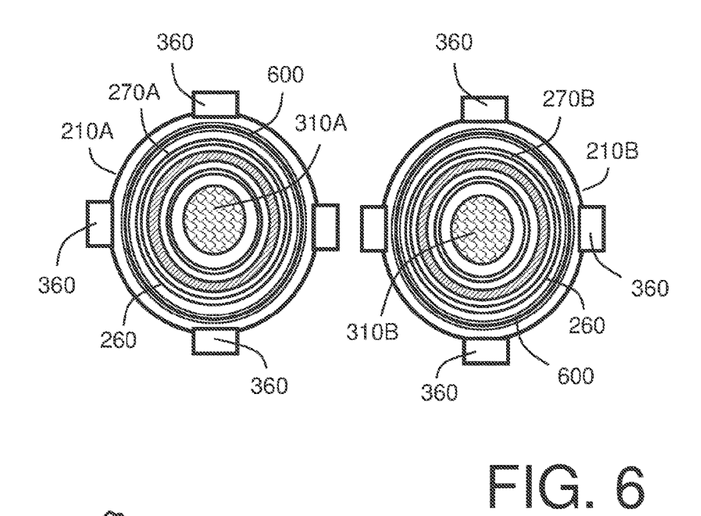
FIG. 6 is an illustration of a transformer pole face configuration of the connector arrangement of FIG. 4.

In some embodiments of the invention as well as high speed data communication, the two components of the connector can transfer electrical power. The principle behind this is described with reference to FIG. 3 and embodiments having this feature are shown in FIGS. 4 to 6. Referring to FIG. 3, a magnetic transformer indicated generally by 110 includes a high-permeability magnetic core 120 defining an at least partially closed magnetic path 130, with at least one primary winding 140 and at least one secondary winding 150 mutually magnetically coupled together via the core 120. Such a transformer 110 is well known, and is potentially capable of transferring large quantities of power between the primary and secondary windings 140, 150.

Moreover, it is further known to implement the magnetic core 120 in a plurality of separate component parts 160A, 160B which can be brought into mutual contact to implement the core 120. Use of such a transformer 110 in underwater environments for transferring alternating current (a.c.) power is known. Beneficially, the transformer 110 is operated at a relatively high alternating frequency when considerable power is to be transferred therethrough, although magnetic hysteresis losses occurring within the magnetic core 120 define up upper frequency regime which can be employed for the transformer 110. When signals employed to excite the windings 140, 150 are derived from high-frequency pulse-width-modulated (PWM) electronic switching units 170, considerable high frequency electrical noise can exist in a vicinity of the core 120, especially when the core 120 is magnetically leaky.

When the transformer 110 is included in an underwater a.c. power connector arrangement 100 illustrated in FIG. 4 together with a wireless link 110, a potential problem arises in that noise generated by pulse-width-modulated (PWM) transformer 110 couples to the wireless link 110 and causes unreliable data communication. This has been recognised in the prior art. For example in order to address such cross-talk, the aforementioned patent application GB 2 457 796 A describes use of a light carrier for an underwater multimode wireless communication system. However, in harsh underwater environments, light carrier arrangements can be potentially unreliable on account of marine growth.

Embodiments of the present invention however avoid the shortcomings associated with existing contemporary underwater power connector arrangements, as will be described with reference to the embodiment of the present invention shown in FIG. 5 and indicated generally by 200. As in the previously described embodiment, the underwater connector arrangement 200 includes a first connector component 210A and a second connector component 210B. The components 210A, 210B are disposed in a mutually abutting manner when the connector arrangement 200 is mated, and are mutually spatially separated when the connector arrangement 200 is in an unmated state. The connector arrangement 200 includes a transformer 250 which includes a high magnetic permeability magnetic core 260 implemented substantially as an annulus, an elliptical form or a polygonal form; optionally, the polygonal form is provided with rounded corners to avoid undesirable magnetic flux leakage. The magnetic core 260 is implemented as two half cores 270A, 270B which are disposed in the two connector components 210A, 210B respectively. At each connector component 210A, 210B, the half cores 270A, 270B each define concentrically disposed complementary pole faces 280A, 280B which are disposed at or near surfaces whereat the components 210A, 210B abut when the connector arrangement 200 is in a mated state. Within the half cores 270A, 270B are disposed corresponding coils 290A, 290B respectively whose one or more windings 300 are concentric to the pole faces 280A, 280B. The cores 270A, 270B are chosen to minimise the introduction of losses in the microwave band.

In a central region 300 of the transformer 250, there is included a wireless microwave interface 310A, 310B similar to that previously described above disposed between the two connector components 210A, 210B. The wireless interface 310A, 310B is beneficially implemented to employ one or more wireless communication channels. Beneficially the one or more wireless microwave communication channels are encompassed within a frequency spectrum extending from 300 MHz to 300 GHz. Again this enables the connector arrangement 200 to provide data communication therethrough at data rates in excess of 1 Gbits per second. Such high data rates are highly desirable when supporting high-definition stereo camera imaging systems and/or performing high-speed non-destructive testing of underwater structures, for example to detect by eddy current measurements formation of stress microcracks in underwater installations, for example pipelines, pressure vessels, well heads and such like. Optionally, the wireless interface 310A, 310B is supplemented with an optical communication link, for example the wireless interface 310A, 310B implemented in a central portion of the cores 260A, 260B as illustrated in FIG. 4, with the optical communication link implemented around the cores 260A, 260B. Optionally, the wireless interface 310A, 310B is implemented additionally or alternatively around an exterior periphery of the cores 260A, 260B.

The wireless interface 310A, 310B may operate in a frequency range of 1 GHz to 6 GHz. Data transmission rates of 1 GBs or more are capable of being achieved in such a wireless operating regime.

The communication protocol employed for the signal modulating the microwave/millimeter wave carrier is conveniently chosen from a pre-existing protocol such as Wi-Fi, Bluetooth, ZigBee etc. This allows easy communication between either of the connector components and on-board equipment if it needs to be brought to the surface on a ship for maintenance or inspection.

Optionally, the components 210A, 210B include a peripheral wireless source 600 for irradiating mutually abutting surfaces of the components 210A, 210B for preventing marine biological growth. Certain electromagnetic radiation frequencies are highly damaging to biological systems when the frequencies correspond to dipole moments of biological molecules essential for biological activity. Beneficially, wireless radiation provided from the wireless source 600 can be modulated to provide synergistically also for data communication through the connector arrangement 200. Optionally, the wireless source 600 is a part of the wireless interface 310A, 310B. Optionally, the wireless interface 310A, 310B is operable to utilize wireless signals of different electric field polarization directions for obtaining enhanced signal-to-noise ratio, and potentially increased data communication rate by way of employing wireless signals of mutually orthogonal electric-field polarization direction.

The wireless interface 310A, 310B beneficially employs an exterior surface of the cores 270A, 270B facing towards a central axis of the connector arrangement 200 and adjacent to the interface 310A, 310B to assist to focus and concentrate wireless electromagnetic radiation between the components 210A, 210B to achieve an enhanced signal-to-noise ratio and hence a potentially greatest bandwidth possible for the connector 200. Optionally the exterior surface is spatially continued as a reflector which substantially encloses an inner electromagnetic volume 350 in which wireless radiation propagation occurs. As previously discussed, the wireless interface 310A, 310B beneficially employs one of more of following antenna types: stub antenna, waveguide horn antenna, patch antenna, dipole antenna, loop antenna.

An advantage of the connector arrangement 200 of FIG. 5 and FIG. 6 is that it is beneficially implemented in a rotationally symmetrical form so that the components 210A, 210B can be mated in mutually different angular orientations, thereby rendering operation of the connector 200 more flexible and easier in underwater environments. A mechanical coupling mechanism 360 is beneficially included around an external periphery of the cores 270A, 270B to ensure that the components 210A, 210B are held robustly together when the connector arrangement 200 is in a mated state. The coupling mechanism 360 is beneficially implemented as a bayonet-type latching mechanism. Alternatively, the coupling mechanism 360 is implemented using electromagnets, for example so that the connector arrangement 200 intrinsically disconnects when the coupling mechanism 360 is de-energized.

The connector arrangement 200 is beneficially potted or otherwise sealed in material which is operable to protect its internal functional parts, for example the transformer 250 and its windings 290A, 290B, the wireless interface 310A, 310B and any power and/or signal processing units included within the components 210A, 210B of the connector arrangement 200. Such potting includes plastics material potting, for example in polyurethane polymer plastics material, silicone rubber, epoxy resin, silica glass and so forth.

In operation, the wireless interface 310A, 310B is optionally used for assisting to centralize the components 210A, 210B when brought together, for example in a underwater environment in particle-filled water wherein optical visibility is severely restricted, for example in a seabed oil and gas drilling facility. Moving the components 210A, 210B laterally with respect to one another whilst the components 210A, 210B are being brought together is beneficially implemented by monitoring a strength of wireless signals exchanged through the wireless interface 310A, 310B and/or monitoring an efficiency of power transfer through the transformer 250. A maximum efficiency of wireless transmission through the interface 310A, 310B occurs when the components 210A, 210B are brought together and their concentric axes mutually align.

Figure 7:
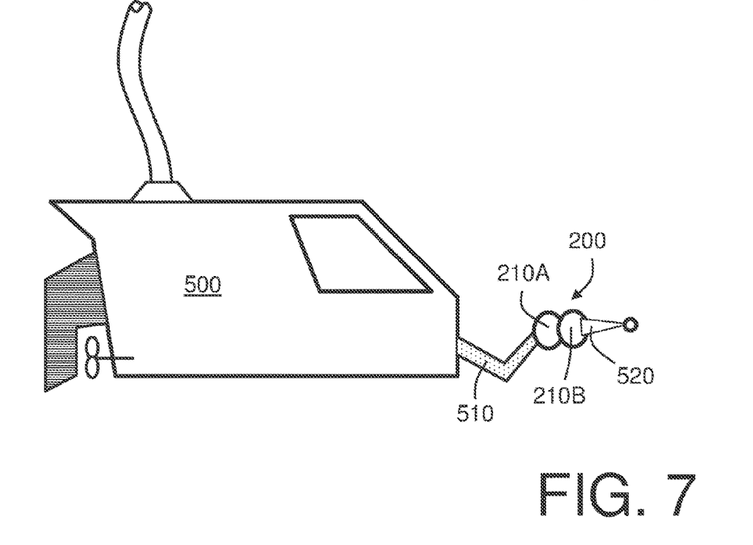
FIG. 7 is an illustration of a remotely operated vehicle (ROV) or submarine for use in underwater environments.

One or more of the components 210A, 210B are beneficially at ends of underwater cables, namely providing a way to join the cables together for establishing power transfer and signal transfer through the cables. Alternatively, one or more of the connectors are included on underwater apparatus, for example for providing a connection location on apparatus to which underwater cables are susceptible to being coupled. Yet alternatively, the components 210A, 210B are both included on apparatus, for example one of the components 210A, 210B on a distal end of an articulated arm 510 of a remote ocean vehicle (ROV) 500, and the other of the components 210A, 210B is included on exchangeable power tools 520 of the ROV 500. Such an arrangement is shown schematically in FIG. 7. Beneficially, the ROV 500 includes a set of exchangeable tools thereon which are susceptible to being dynamically swapped during operation of the ROV 500 when executing an underwater task, for example performing survey, salvage, inspection, maintenance, repair and construction tasks.

The underwater connector arrangement 200 is susceptible to being employed for offshore renewable energy systems, for example ocean wave energy generators, offshore wind turbines, offshore tidal energy generation systems. Moreover, the underwater connector arrangement is beneficially employed for offshore oil and gas exploration and production installations, for providing telecommunication links and power links to isolated islands, for example in an archipelago small islands, along roadways subject to flooding, along railway lines subject to flooding, and so forth. Various practical applications for the connector arrangement 200 are provided in other parts of this patent document describing the present invention.

The connector arrangement 200 beneficially includes signal processing units, data processing units, signal conditioning and power-handling electronic devices, for example PWM units, wireless units and so forth. Optionally, the data processing arrangement is operable to perform dynamic impedance matching of at least one of the transformer 250 and the wireless interface 310A, 310B, for example to ensure most efficient power transfer though the transformer 250 and/or most efficient transfer of wireless radiation across the interface 310A, 310B. Such dynamic impedance matching beneficially also includes selection of a most beneficial frequency of operation. For example, marine growth on mutually abutting surfaces of the components 210A, 210B is susceptible to resulting in a slightly larger operating mutually separation of the cores 270A, 270B which changes an inductance of the windings 290A, 290B of the transformer 250. When the transformer is being operated in a high-frequency resonant manner to ensure most efficient power transfer, tuning of the windings 290A, 290B is important and is beneficially implemented dynamically in the connector arrangement 200, for example by dynamically altering an operating frequency employed with respect to the transformer 250 and/or by adjusting dynamically reactive components employed with the windings 290A, 290B (for example tuning capacitors). As aforementioned, tuning of the wireless interface 310A, 310B by tuning reactive components and/or by choice of signal operating frequency, for example signal carrier frequency, is also beneficially performed in the connector arrangement 200 when in operation.

Figure 8:
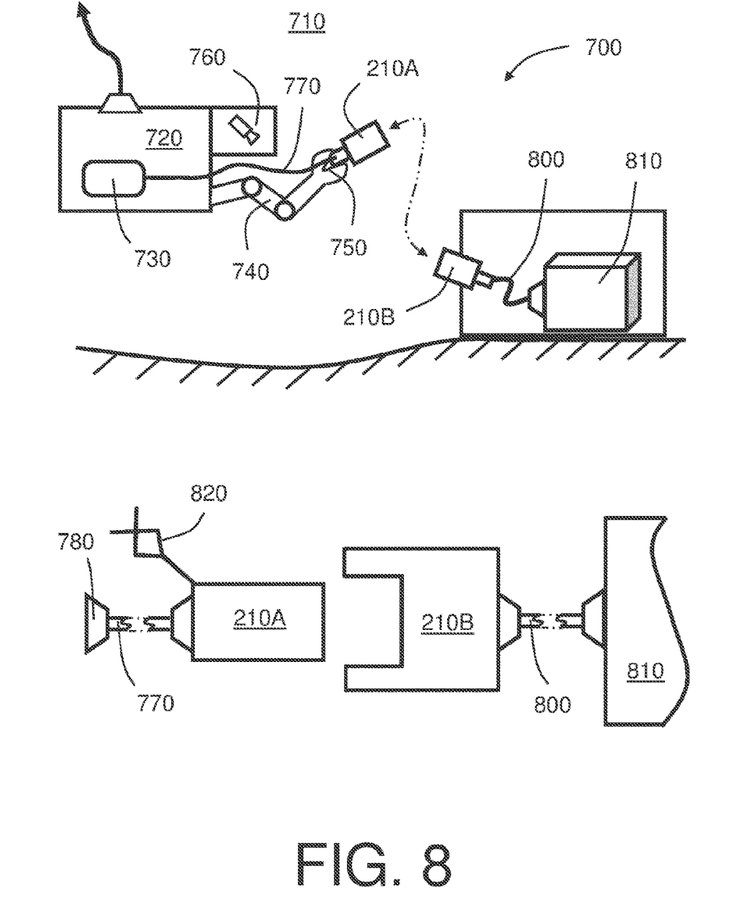
FIG. 8 is an illustration of uses of the underwater connector arrangement of FIG. 4 in an underwater environment.

Referring to FIG. 8, there is shown an underwater configuration indicated generally by 700 in an underwater environment 710, for example at an ocean bed. A remotely operated vehicle (ROV) 720 is coupled via an umbilical cable to a surface location or other submerged apparatus (not shown). The ROV 720 includes a ROV junction box (JB) 730 and is also equipped with an articulated arm 740 including a distal gripping jaw 750 and a viewing camera arrangement 760. A flexible cable 770 is coupled between the ROV JB 730 and a connector 210A as aforementioned. The configuration 700 further includes an underwater facility including an underwater tool and/or subsea control module 810 coupled via a cable 800 to a component 210B as aforementioned. Optionally, the component 210A includes a ROV handle 820 which is more easily gripped by the gripping jaw 750. The cable 770 is terminated in a connector, for example a proprietary SeaCon 55 series product. The ROV 720 is beneficially remotely controlled in operation to mate and unmate the components 210A, 210B for making and breaking connection respectively. The configuration and its associated operation enable electrical power and communication to be provided, for example to seabed mounted apparatus or to apparatus deployed underwater temporarily.

Thus it will be seen that embodiments of the invention can provide an improved underwater connector arrangement which is potentially easier to connect and disconnect, is capable of coupling wireless signals more efficiently and with enhanced signal bandwidth and which is easier to manufacture using readily available component parts.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. An underwater connector arrangement comprising:
a first component comprising a first antenna; and
a second component comprising a second antenna;
wherein the first component and the second component are mated together;
wherein the first antenna is configured to transmit data to the second antenna via an electromagnetic carrier wave having a frequency of between 300 MHz and 300 GHz while the first component is underwater;
wherein the first antenna is received in a first submersible encapsulation having a maximum external dimension equal to or greater than one eighth of the wavelength of the electromagnetic carrier wave and wherein the first submersible encapsulation is provided on a submersible cable or an underwater apparatus; and
wherein the second antenna is configured to receive data from the first antenna via the electromagnetic carrier wave while the second component is underwater; and
wherein the second antenna is received in a second submersible encapsulation having a maximum external dimension equal to or greater than one eighth of the wavelength of the carrier wave.

2. The underwater connector arrangement as claimed in claim 1 wherein the first antenna is configured to transmit data to the second antenna by means of radiation/propagation of the carrier wave when the second antenna is separated from the first antenna by a distance which is more than one-eighth of the wavelength of said carrier wave.

3. The underwater connector arrangement as claimed in claim 1, wherein the carrier wave frequency is in the range of 1 GHz to 20 GHz, preferably 1 GHz to 6 GHz.

4. The underwater connector arrangement as claimed in claim 1 wherein said second antenna has an active portion which has a maximum dimension larger than one-eighth of the wavelength of said carrier wave.

5. The underwater connector arrangement as claimed in claim 1 wherein the second encapsulation is provided on a submersible cable or an underwater apparatus.

6. The underwater connector arrangement as claimed in claim 1 wherein said first component is arranged to transmit data using a predefined protocol for wireless data transmission in air.

7. The underwater connector arrangement as claimed in claim 6 wherein said first component is arranged to adapt its transmission when the first component is temporarily in air.

8. The underwater connector arrangement as claimed in claim 1 configured to allow data transmission with the first and second components at a plurality of mutual rotational positions.

9. The underwater connector arrangement as claimed in claim 1 wherein the first antenna is arranged to transmit directionally.

10. The underwater connector arrangement as claimed in claim 1 wherein said encapsulation comprises a non-metallic emission surface arranged so that in use said wave passes through said surface.

11. The underwater connector arrangement as claimed in claim 1 wherein the first and second components include a power transfer arrangement for transferring electrical power between the first and second components.

12. The underwater connector arrangement as claimed in claim 11 wherein the power transfer arrangement comprises respective parts in the first and second components which cooperate to transfer power through inductive coupling and/or capacitive coupling.

13. The underwater connector arrangement as claimed in claim 11 wherein the power transfer arrangement is disposed to allow power to be transferred with the first and second components at a plurality of mutual rotational positions.

14. The underwater connector arrangement as claimed in claim 1 wherein said first and second components are provided with a latching arrangement for binding the first and second components together.

15. The underwater connector arrangement as claimed in claim 14, wherein the latching arrangement is implemented as a magnetic latching arrangement.

16. The underwater connector arrangement as claimed in claim 1 further comprising an optical data communication arrangement and/or an acoustic communication arrangement for communicating data between the first and second components.

17. A method of transferring data between a first underwater component and a second underwater component of a connector arrangement the method comprising:
transmitting an electromagnetic carrier wave having a frequency of between 300 MHz and 300 GHz from a first antenna in the first underwater component to a second antenna in the second underwater component when the first underwater component and the second underwater component are mated together;
wherein the first antenna is received in a first submersible encapsulation having a maximum external dimension which is equal to or greater than one eighth of the wavelength of the electromagnetic carrier wave and wherein the first submersible encapsulation is provided on a submersible cable or an underwater apparatus; and
wherein the second antenna is received in a second submersible encapsulation having a maximum external dimension which is equal to or greater than one eighth of the wavelength of the electromagnetic carrier wave.

* * * * *